United States Patent [19]

Boling et al.

[11] 4,125,816

[45] Nov. 14, 1978

[54] SOLID STATE LASER HAVING TWO OUTPUT WAVELENGTHS

[75] Inventors: Norman L. Boling, Toledo, Ohio; George Dube, Temperance, Mich.

[73] Assignee: Owens-Illinois, Inc., Toledo, Ohio

[21] Appl. No.: 769,976

[22] Filed: Feb. 18, 1977

[51] Int. Cl.² ............................................. H01S 3/16
[52] U.S. Cl. ............................................. 331/94.5 F
[58] Field of Search ............ 331/945 D, 945 E, 945 F

[56] References Cited

U.S. PATENT DOCUMENTS

| 3,766,493 | 10/1973 | Nicolai et al. | 331/94.5 D |
|---|---|---|---|
| 3,842,368 | 10/1974 | Myers | 331/94.5 E |
| 4,050,034 | 9/1977 | Barry et al. | 331/94.5 G |

*Primary Examiner*—William L. Sikes
*Assistant Examiner*—Marcus S. Rasco
*Attorney, Agent, or Firm*—S. M. McLary

[57] ABSTRACT

A solid state laser including a plurality of plate like lasable elements in an array on a common optical axis. There are two different plate like elements, arranged in an alternating pattern, each containing a lasing ion which lases at a wavelength that is different from the wavelength of the other. The lasing ions and host materials are chosen so that there are two distinct spectral regions in which the lasing output of one plate element is not strongly absorbed by the other plate element.

4 Claims, 1 Drawing Figure

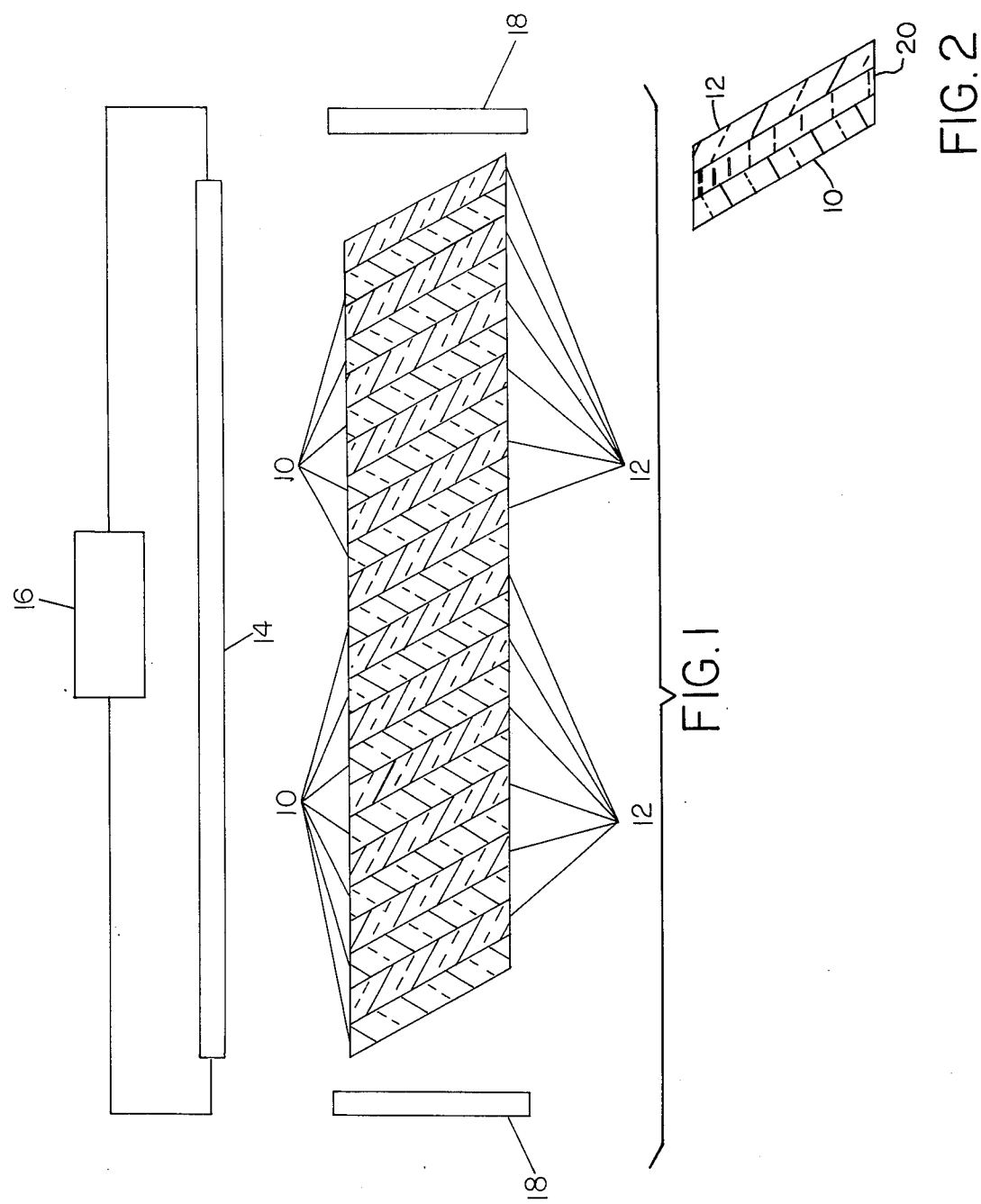

SOLID STATE LASER HAVING TWO OUTPUT WAVELENGTHS

BACKGROUND OF THE INVENTION

This invention generally relates to solid state laser devices. More particularly, this invention relates to such a laser device which has an output at two distinct wavelengths. Specifically, this two frequency output is achieved by using an array of two different solid state plate like elements, one of which lases at one wavelength and the other at a second wavelength.

It is known that most solid state lasing materials are pumped by only a small spectral fraction of the white light used to pump these materials. The overall efficiency of such lasers is therefore rather low since most of the pump light is wasted. One attempted solution to this problem has been to try co-doping such materials with sensitizers which absorb light not absorbed by the lasing species and transfer some of this absorbed energy to the lasing species. Unfortunately, the sensitizers used to date often tend to quench the lasing species.

One way to increase the efficiency of a laser is to use materials which absorb in different spectral regions of the white pump light. This then gives a laser with two wavelengths as an output beam. Two wavelength lasers are valuable in several instances: two wavelength holography; two-step isotype separation or photochemical processing; increasing the tunable range of the laser; minimizing the interference effects of monochromatic laser radiation; and pollution monitoring with laser beams. U.S. Patent Application Ser. No. 727,826, filed Sept. 29, 1976, and having an assignee and one inventor in common with this application, discloses a hybrid laser structure in which a liquid coolant lases at one wavelength and a solid element lases at a second wavelength.

We have found that a similar result may be obtained using two solid state plate like elements. An all solid state laser of this type avoids the complexity of a liquid circulation and containment system, as well as the inaccuracies imparted by the variable expansion experienced by a liquid laser. In our invention, a plurality of solid state plate like elements are arranged in an array. The array has two different plate like elements arranged in an alternating pattern. One series of plate elements absorb light in one spectral region of white pump light while the other plate elements absorb in a second spectral region of white pump light. The two plate elements then lase at two distinct wavelengths. It is critical that the material for the plate elements be selected so that neither absorbs light in the wavelength at which the other lases.

SUMMARY OF THE INVENTION

Our invention is an improved laser structure. One component of the laser is a first plurality of solid state, plate like lasable elements having a first absorption region of white pump light and an output beam at a first wavelength. The first plurality of elements are aligned in a spaced apart array along a common optical axis. Also provided is a second plurality of solid state, plate like lasable elements which have a second absorption region of white pump light and an output beam at a second wavelength. The second plurality of elements are aligned in an alternating, adjoining pattern with the first plurality of elements along the same common optical axis. Also included is a means for furnishing white pump light and end mirror means.

BRIEF DESCRIPTION OF THE DRAWING

FIG. 1 is a schematic, side elevation view, partially in cross-section, illustrating the improved laser structure of the present invention.

FIG. 2 is a schematic view of two solid state plate elements of the laser structure of FIG. 1, with the addition of a transparent liquid between the plate elements.

DETAILED DESCRIPTION OF THE DRAWING

As is seen in the drawing figure, the basic laser structure of the present invention includes a plurality of plate like elements 10 which lase at one wavelength and a second plurality of plate like elements 12 which lase at a second wavelength. These elements 10 and 12 are preferably placed in abutting relationship, touching one another if desired, and may be supported in any desired manner, as for example by notches cut into a support member. There is also provided is a flash lamp 14 which is elongated to cover substantially the entire extent of the array of discs 10 and 12. The flash tube 14 is supplied with operating energy from a power source 16. The laser array may be completed at its ends by a pair of end mirrors 18 as is well known in the art.

The plate elements 10 and 12 are placed at an oblique angle with respect to the axis for two primary reasons. First, this angle allows the majority of the pumping light from the flash tube 14 to travel through both plates 10 and 12 during any single pass through the plate. Second, in those cases where the refractive indicies of the materials used for the plates 10 and 12 are different, the angular placement allows the use of Brewster's angle so that for one polarization of the light there will be very little reflection losses at the interface between adjacent plate elements 10 and 12. To completely avoid such reflection at the interface, if such is required, the space between abutting plate members 10 and 12 may be filled with a transparent liquid 20 that index matches one of the plate elements 10 or 12, as shown in FIG. 2.

The material used for the plate elements 10 and 12 in the present invention may be glass and crystalline material such as glass, ruby, garnet, YAG and plastics. The lasing ions are preferably chosen to be a rare earth ion as is known in the art. Additionally, trivalent chromium and neodymium$^{3+}$ are also well known and usable. The primary requirement for operation is that the plate elements 10 and 12 be so configured that each will absorb white pump light in a different spectral region from the other and lase at a different wavelength from the other. This choice of materials, as has been pointed out, allows a more complete absorption of the white pumping light and may also broaden the lasing bandwidth or tunability of a single lasing species by employing this species in two or more different hosts. It is well known that the absorption spectra and the lasing spectra of lasing ions, atoms, or molecules can be shifted by changing the host material. This shift in the absorption spectra can be used to increase the absorption of white pumping light and the shift in the lasing spectra can be used to increase the tunability or bandwidth of a laser constructed in accordance with the present invention. Other rare earth ions which can be used as the doping element for the plate elements may include Praseodymium$^{+++}$, Samarium$^{++}$, Samarium$^{+++}$, Europium$^{++}$, Europium$^{+++}$, Terbium$^{+++}$, Erbium$^{+++}$, and Ytterbium$^{+++}$.

The precise shape of the plate elements 10 and 12 is not critical, although both should be of the same general configuration to avoid problems caused by a lack of symmetry. For example, the plate elements 10 and 12 could be square or disc shaped. The advantages of this invention are thus obtained by choosing the lasing species of the plate elements 10 and 12 so that both can be pumped and lased at different wavelengths. There must be two distinct spectral regions in which the lasing output of one species is not strongly absorbed by either of the host materials or by the other lasing species. Examples of combinations of materials which satisfy this criterion are as follows: ruby and YAG doped with $Nd^{3+}$; YAG doped with $Er^{3+}$ and YAG doped with $Nd^{3+}$; $LaF_3$ doped with $Nd^{3+}$ and $La_2O_3$ doped with $Nd^{3+}$; and YAG doped with $Er^{3+}$ and glass doped with Nd. Note that in one example given the lasing ion is the same, $Nd^{3+}$, but the host material is different, thus giving the differential spectral absorption and lasing properties which are required.

What we claim is:

1. A laser structure which comprises, in combination:

a first plurality of solid state, plate like lasable elements having a first absorption region of white pump light and an output beam at a first wavelength, said first plurality of elements being aligned in a spaced apart array along a common optical axis;

a second plurality of solid state, plate like lasable elements having a second absorption region of white pump light and an output beam at a second wavelength, said second plurality of elements being aligned in an alternating, adjoining pattern with said first plurality of elements along said common optical axis and said first and second pluralities of elements being such that neither strongly absorbs said first and second output beam wavelengths;

means for furnishing white pump light to said first and second elements; and end mirror means for said array of first and second elements.

2. The laser structure of claim 1 which is further defined by said alternating first and second elements being in contact with one another.

3. The laser structure of claim 2 which further includes a transparent liquid, between said contacting first and second elements, that matches the index of refraction of one of said first and second elements.

4. The laser structure of claim 1 which is further defined by said first and second elements being inclined at an angle with respect to said optical axis and said means for furnishing white pump light to allow passage of a majority of pump light through both of said elements.

* * * * *